US012630674B2

(12) United States Patent
Mueller et al.

(10) Patent No.: US 12,630,674 B2
(45) Date of Patent: May 19, 2026

(54) POLYMER AND A PRODUCT OR ARTICLE COMPRISING OR CONSISTING OF THE POLYMER

(71) Applicants: Andreas Stihl AG & Co. KG, Waiblingen (DE); B4PLASTICS, Maasmechelen (BE)

(72) Inventors: Philipp Mueller, Osterburken (DE); Christoph Hiller Von Gaertringen, Stuttgart (DE); Christoph Weissenberger, Remseck (DE); Stefan Schweiger, Esslingen (DE); Simon Haug, Waiblingen (DE); Bjoern Petersen, Grossbottwar (DE); Kersten Woike, Stolberg (DE); Stefaan De Wildeman, Maasmechelen (BE)

(73) Assignees: Andreas Stihl AG & Co. KG, Waiblingen (DE); B4PLASTICS, Maasmechelen (BE)

( * ) Notice: Subject to any disclaimer, the term of this patent is extended or adjusted under 35 U.S.C. 154(b) by 605 days.

(21) Appl. No.: 18/018,096

(22) PCT Filed: Jul. 26, 2021

(86) PCT No.: PCT/EP2021/070845
§ 371 (c)(1),
(2) Date: Jan. 26, 2023

(87) PCT Pub. No.: WO2022/023258
PCT Pub. Date: Feb. 3, 2022

(65) Prior Publication Data
US 2023/0287177 A1 Sep. 14, 2023

(30) Foreign Application Priority Data
Jul. 27, 2020 (EP) .................................... 20187974

(51) Int. Cl.
*C08G 69/26* (2006.01)
*C08G 69/36* (2006.01)
*C08G 69/44* (2006.01)

(52) U.S. Cl.
CPC ........... *C08G 69/265* (2013.01); *C08G 69/36* (2013.01); *C08G 69/44* (2013.01)

(58) Field of Classification Search
CPC ....... C08G 69/265; C08G 69/36; C08G 69/44
See application file for complete search history.

(56) References Cited

U.S. PATENT DOCUMENTS

| | | | |
|---|---|---|---|
| 4,420,608 | A | 12/1983 | Morello |
| 5,644,020 | A | 7/1997 | Timmermann et al. |
| 5,880,252 | A | 3/1999 | Kim et al. |
| 2004/0127588 | A1 | 7/2004 | Calumdann et al. |
| 2014/0135449 | A1 | 5/2014 | Jeol |
| 2014/0140939 | A1 | 5/2014 | Lin et al. |
| 2015/0065650 | A1 | 3/2015 | Davies et al. |
| 2016/0002403 | A1 | 1/2016 | Erdodi et al. |
| 2017/0081474 | A1 | 3/2017 | Erdodi et al. |
| 2017/0218200 | A1 | 8/2017 | Ahn et al. |
| 2019/0023839 | A1 | 1/2019 | Miller et al. |

FOREIGN PATENT DOCUMENTS

| | | | |
|---|---|---|---|
| CH | 580126 | A5 | 9/1976 |
| CN | 1511170 | A | 7/2004 |
| CN | 103703054 | A | 4/2014 |
| CN | 103732211 | A | 4/2014 |
| CN | 105121509 | A | 12/2015 |
| CN | 107011513 | A | 8/2017 |
| DE | 4333238 | A1 | 4/1995 |
| EP | 2 842 406 | A1 | 3/2015 |
| WO | WO 2013/057748 | A1 | 4/2013 |
| WO | WO 2014/126739 | A1 | 8/2014 |
| WO | 2016/014378 | A1 | 1/2016 |

OTHER PUBLICATIONS

Chinese-language Office Action issued in Chinese Application No. 202180049494.0 dated Jul. 16, 2024, with English translation (30 pages).
Office Action issued in European Application No. 21751785, dated Jun. 2, 2025 (5 pages).
Wang, Z., et al.; “Synthesis of Fully Bio-based Polyamides with Tunable Properties by Employing ltaconic Acid”, Polymer, 2014 (11 pages).
Noordzij, G., et al.; “Improving the Hydrolysis Rate of the Renewable Poly(hexamethylene sebacate) through Copolymerization of a Bis(pyrrolidone)-Based Dicarboxylic Acid”, Polymers, 2019, 11, 1654 (14 pages).
Roy, M., et al.; “Renewable (Bis)pyrrolidone Based Monomers as Components for Thermally Curable and Enzymatically Depolymerizable 2-Oxazoline Thermoset Resins”, ACS Sustainable Chem. Eng. 2018, 6, 5053-5066 (14 pages)).
Qi, P., et al.; “Synthesis of Biorenewable and Water-degradable Polylactam Esters from ltaconic Acid”, The Royal Societ of Chemisty, 2016 (6 pages).

(Continued)

*Primary Examiner* — Gregory Listvoyb
(74) *Attorney, Agent, or Firm* — Crowell & Moring LLP

(57) ABSTRACT

A polymer having a backbone chain, wherein the backbone chain includes linear amide linkages and nitrogen-atom-containing heteromonocyclic moieties, wherein the backbone chain is free of peptide linkages or wherein the backbone chain has a proportion of peptide linkages of maximum 30%, based on a total number of the linear amide linkages of the backbone chain, and wherein the nitrogen-atom-containing heteromonocyclic moieties have a proportion of 5% by weight to 25% by weight, based on the total weight of the polymer, is provided. A product or article and the use of the polymer for manufacturing or producing the product or article are further provided.

12 Claims, 2 Drawing Sheets

(56) References Cited

OTHER PUBLICATIONS

Ali, Mohammed Asif, et al.; "Syntheses of High-Performance Biopolyamides Derived from Itaconic Acid and Their Environmental Corrosion", Macromolecules, 2013, pgs. A-G (7 pages).

International Search Report (PCT/ISA/210) issued in PCT Application No. PCT/EP2021/070845 dated Nov. 15, 2021 (four (4) pages).

Written Opinion (PCT/ISA/237) issued in PCT/EP2021/070845 dated Nov. 15, 2021 (seven (7) pages).

Ayadi et al., "Synthesis of bis(pyrrolidone-4-carboxylic acid)-based polyamides derived from renewable itaconic acid-application as a compatibilizer in biopolymer blends," Polymer Journal, Jul. 1, 2013, pp. 766-774, vol. 45, No. 7, XP055438466 (nine (9) pages).

European Communication pursuant to Rule 114(2) EPC issued in European Application No. 21751785.3 dated Nov. 19, 2025 (4 pages).

POLYMER AND A PRODUCT OR ARTICLE COMPRISING OR CONSISTING OF THE POLYMER

CROSS-REFERENCE TO RELATED APPLICATIONS

This application claims priority under 35 U.S.C. § 371 to International PCT Application No. PCT/EP2021/070845, filed 26 Jul. 2021, which claims the benefit of EP Patent Application No. 20187974.9, filed 27 Jul. 2020, each of which is incorporated by reference herein in its entirety.

FIELD

The present disclosure relates to a polymer. Further, the disclosure relates to a product or article, comprising or consisting of the polymer.

BACKGROUND AND SUMMARY

Polymers being applied for example for elongated products or articles such as trimmer lines are generally known.

For example, it is known to employ non-biodegradable plastics for the manufacture of trimmer lines. However, the durability and strength of such plastics are disadvantageous inasmuch as they are difficult to dispose of and tend to persist in the environment for extremely long periods of time. Most conventional plastics are typically composed of petroleum-based materials such as polyethylene and polypropylene or alternatively are composed of polyamide such as polyamide 6 or 66. Those plastics are resistant to biodegradation resulting in solid waste in landfills that is harmful to the natural environment.

In order to reduce ecological damage, biodegradable plastics on a polyamide base have been developed. For example, a biodegradable polyamide-based composition being suitable as trimmer line is known from EP 2 842 406 $A_1$. The biodegradable polyamide-based composition includes amino acid units being substantially uniformly dispersed within the polyamide matrix.

A polymer blend being suitable as trimmer line is known from WO 2013/057748 $A_1$. The polymer blend comprises polyamide 6 added with a plasticizer, copolyamide 6/66, a biodegradability promoting additive and a dye.

The conventional biodegradable polymer materials often suffer from the disadvantage that their biodegradation properties are only achievable by a concurrent loss of mechanical strength. A further disadvantage of conventional biodegradable polymers is that they are often only degradable into micro plastics resulting in an environmental accumulation of plastics anyway.

BRIEF DESCRIPTION OF THE DRAWINGS

In order that the present disclosure may be well understood, there will now be described various forms thereof, given by way of example, reference being made to the accompanying drawings. The components in the figures are not necessarily to scale.

Figure 1:
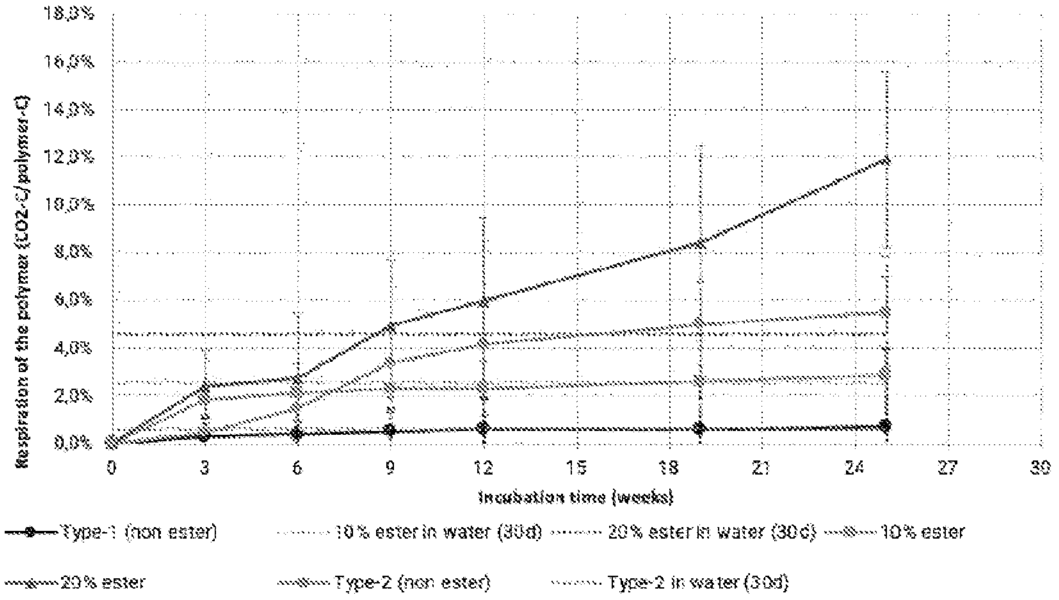
FIG. 1 illustrates a graph of curves for degradation in water under ASTM $D_{5988}$ conditions of examples of polymers as a comparison to soil microbial degradation, according to the principles of the present disclosure.

The drawings described herein are for illustration purposes only and are not intended to limit the scope of the present disclosure in any way.

DETAILED DESCRIPTION OF THE DRAWINGS

In view of the foregoing, the object underlying the present disclosure is therefore to provide a polymer which at least partly circumvents the above-described disadvantages, in particular to provide an environmental friendly polymer having a biodegradable characteristic and concurrently sufficient mechanical strength such as tensile strength. Further, it is an object of the present disclosure to provide a product or article comprising or consisting of the polymer.

The above objects are accomplished by a polymer and by a product or an article described herein. Examples of the polymer and the product or article are described herein. The subject-matter and wording, respectively of all claims is hereby incorporated into the description by explicit reference.

A first aspect relates to a polymer having, or comprising or consisting essentially of, or consisting of, a backbone chain, that is, a polymeric backbone chain, wherein the backbone chain contains or comprises linear amide linkages (linear amide bonds) and nitrogen-atom-containing heteromonocyclic moieties. Thus, both the linear amide linkages and the nitrogen-atom-containing heteromonocyclic moieties are part of the polymer' s backbone chain.

The backbone chain of the polymer is free of peptide linkages. Alternatively, the backbone chain of the polymer has a proportion of peptide linkages of maximum 30%, that is, of >0% to 30%, in particular of maximum 25%, that is, of >0% to 25%, based on the total number of the linear amide linkages of the backbone chain of the polymer.

The polymer is in particular featured in that the nitrogen-atom-containing heteromonocyclic moieties have a proportion of 5% by weight to 25% by weight, in particular 5% by weight to ≤20% by weight, preferably 5% by weight to <20% by weight, more preferably 5% by weight to 17% by weight, particularly preferably 5% by weight to 15% by weight, based on the total weight of the polymer.

In particular the nitrogen-atom-containing heteromonocyclic moieties may have a proportion of 10% by weight to 25% by weight, in particular 10% by weight to <20% by weight, preferably 10% by weight to <20% by weight, more preferably 10% by weight to 17% by weight, particularly preferably 10% by weight to 15% by weight, based on the total weight of the polymer.

Preferably, the polymer is a thermoplastic polymer.

Principally, the polymer may be a randomized copolymer or a block copolymer. Preferably, the polymer is a randomized copolymer.

The term "backbone chain" or "polymeric backbone chain", respectively, as used according to the present disclosure, refers to the longest series of covalently bonded atoms that together create the continuous chain of the polymer. Thus, the term "backbone chain" or "polymeric backbone chain" as used according to the present disclosure can be defined as the main chain to which all other chains, if any, long or short or both, may be regarded as being pendent.

Preferably, the backbone chain of the polymer is a linear backbone chain, that is, a backbone chain which is not covalently bonded or connected to any side chains. In other words, preferably, the backbone chain is free of any side chains. More preferably, the polymer itself is a linear polymer.

Further, the polymer may preferably be a not cross-linked or not cross-linkable polymer or may preferably be not in a cross-linked condition.

In the alternative, the backbone chain of the polymer may be an essentially linear backbone chain.

The term “essentially linear backbone chain” as used according to the present disclosure refers to a backbone chain which is covalently bonded or connected to side chains having a molecular weight of ≤500 Da, in particular 15 Da to 500 Da. The side chains may be unbranched, branched, non-cyclic or acyclic side chains. Further, the side chains may be aliphatic, in particular alkyl and/or alkenyl and/or alkinyl, and/or arylic groups. Further, the side chains may be heteroatom containing groups. Preferably, the side chains are covalently attached to a heteromonocyclic ring structure of the nitrogen-atom-containing heteromonocyclic moieties. In particular, the side chains being covalently attached to the heteromonocyclic ring structure of the nitrogen-atom-containing heteromonocyclic moieties are the only side chains of the backbone chain of the polymer.

The term “linear amide linkages” as used according to the present disclosure refers to amide linkages being not part of a ring structure, in particular of the nitrogen-atom-containing heteromonocyclic moieties or any other (hetero)cyclic moieties. Preferably, the nitrogen atom of each of the linear amide linkages is bonded to a hydrogen atom, that is, bears a hydrogen atom as a substituent.

The term “peptide linkage” as used according to the present disclosure refers to an amide type of covalent chemical bond linking two consecutive alpha-amino acids between the carboxy group of one alpha-amino acid and the amino group of the alpha-carbon atom of another alpha-amino acid, along a peptide or protein chain.

The term “nitrogen-atom-containing heteromonocyclic moieties” as used according to the present disclosure refers to moieties, to be more precise organic moieties, having, that is, comprising, consisting essentially of, or consisting of, one, that is, only one or a sole, ring structure having at least one ring-forming nitrogen atom. Preferably, the ring structure has one or two, in particular only one or two, ring-forming nitrogen atoms. In particular, the term “nitrogen-atom-containing heteromonocyclic moieties” as used according to the present disclosure refers to heteromonocyclic moieties containing at least one nitrogen atom. Further, the at least one nitrogen atom of the heteromonocyclic moieties may be substituted or non-substituted, that is, may bear a sub stituent or no sub stituent. If the at least one nitrogen atom bears a substituent, the substituent is preferably a hydrogen atom or a methylene group. More preferably, the nitrogen-atom-containing heteromonocyclic moieties are free of any heteroatom other than nitrogen atom. In particular, the nitrogen-containing heteromonocyclic moieties are free of oxygen atom or oxygen atoms and/or free of sulfur atom or sulfur atoms. The term “nitrogen-atom-containing heteromonocyclic moieties” as used according to the present disclosure may also be termed as “heteromonocyclic moieties containing, that is, which contain, at least one nitrogen atom.”

Further, the nitrogen-atom-containing heteromonocyclic moieties according to the present disclosure may be saturated nitrogen-atom-containing heteromonocyclic moieties and/or unsaturated, in particular aromatic or arylic, nitrogen-atom-containing heteromonocyclic moieties.

The term “at least one ring-forming nitrogen atom” as used according to the present disclosure refers to at least one nitrogen atom which together with other atoms, preferably carbon atoms, forms a ring structure.

The present disclosure inter alia rests on the surprising finding that the degradation properties, such as degradation speed and/or degradation conditions, and also the mechanical strength properties, such as tensile strength, of the polymer can be advantageously adjusted by the proportion of the nitrogen-atom-containing heteromonocyclic moieties along the polymer’s backbone chain and in particular by the nature and/or position and/or orientation and/or spacing of the nitrogen-atom-containing heteromonocyclic moieties. Advantageously, the nitrogen-atom-containing heteromonocyclic moieties via their at least one nitrogen atom represent more polar water-attractive spots and cause backbone chain scission in a controlled way in different habitats, such as soil. The biodegradation characteristic of the polymer may be additionally optimized by the presence, position and orientation of the linear amide linkages along the polymer’s backbone chain. Thus, the polymer according to the present disclosure is in particular employable for the manufacture of products or articles being exposed or exposable to moisture and/or water and/or having a large surface being capable of reacting with moisture and water. Particularly in that regard, the polymer facilitates a targetedly and thus application-dependent balance between biodegradation on the one hand and mechanical strength on the other hand. Due to its biodegradable and in addition sufficient mechanical properties, the polymer advantageously facilitates reduction of environmental contamination without impairing application-dependent functionality of the products and articles, respectively. In particular, the polymer may advantageously have workability properties, particularly in terms of melting point and/or viscosity, which are comparable to those of conventional polyamides.

Therefore, the polymer according to the present disclosure is a biodegradable polymer.

The term “biodegradable polymer” as used according to the present disclosure refers to a polymer which is at least partly, in particular only partly or completely, biodegradable.

The term “biodegradable” or “biodegradation” as used according to the present disclosure refers to any physical or chemical change in the polymer caused by any environmental factor, including light, heat, moisture, wind, chemical conditions, or biological activity. Typically, the polymer of the present disclosure is degraded into carbon dioxide, water, and biomass as a result of the action of water and/or living organisms and/or enzymes.

Preferably, the polymer according to the present disclosure is a polymer being biodegradable, in particular hydrolysable, to low molecular and naturally occurring compounds such as water, carbon dioxide, and the like.

Further, due to the biodegradable nature of the polymer, the additional use of biodegradation promoting additives is advantageously dispensable. Thus, the polymer is preferably free of any biodegradation promoting additives.

Preferably, apart from the nitrogen-atom-containing heteromonocyclic moieties, the polymer or backbone chain of the polymer is free of any heterocyclic moieties, in particular any arylic moieties. In particular, the polymer or backbone chain of the polymer may be free of oxygen-atom- and/or sulfur-atom-containing heterocyclic moieties, that is, heterocyclic moieties containing, that is, which contain, at least one oxygen atom and/or at least one sulfur atom.

The term "oxygen-atom-containing heterocyclic moieties" as used according to the present disclosure refers to moieties, to be more precise organic moieties, having, that is, comprising, consisting essentially of, or consisting of, a ring structure having at least one ring-forming oxygen atom.

The term "at least one ring-forming oxygen atom" as used according to the present disclosure refers to at least one oxygen atom which together with other atoms, preferably carbon atoms, forms a ring structure.

The term "sulfur-atom-containing heterocyclic moieties" as used according to the present disclosure refers to moieties, to be more precise organic moieties, having, that is, comprising, consisting essentially of, or consisting of, a ring structure having at least one ring-forming sulfur atom.

The term "at least one ring-forming sulfur atom" as used according to the present disclosure refers to at least one sulfur atom which together with other atoms, preferably carbon atoms, forms a ring structure.

In an example of the disclosure, the backbone chain of the polymer further contains or comprises linear ester linkages (linear ester bonds). Advantageously, the additional presence of linear ester linkages along the polymer s backbone chain contributes to a further optimization of the polymer' s biodegradation characteristic. In particular, incorporation of linear ester linkages in the polymer's backbone chain may further fine-tune chain scission of the backbone chain in a controlled way.

The term "linear ester linkages" as used according to the present disclosure refers to ester linkages being not part of a ring structure, in particular of the nitrogen-atom-containing heteromonocyclic moieties or any other (hetero)cyclic moieties.

Preferably, the linear ester linkages may have a proportion of 0.5% by weight to 25% by weight, in particular 1% by weight to 20% by weight, preferably 3% by weight to 15% by weight, based on the total weight of the polymer.

Alternatively, the backbone chain of the polymer may be preferably free of linear ester linkages, in particular ester linkages (in general).

In a further example of the disclosure, the linear amide linkages have a proportion of 1% by weight to 25% by weight, in particular 5% by weight to 25% by weight, preferably 10% by weight to 25% by weight, based on the total weight of the polymer.

Typically, the backbone chain of the polymer further contains or comprises spacer moieties. The spacer moieties advantageously contribute to the mechanical, in particular tensile, strength of the polymer. Particularly by the length of the spacer moieties and/or by the position of the spacer moieties and/or by the frequency of the spacer moieties along the polymer's backbone chain, the mechanical, in particular tensile, strength of the polymer may be targetedly and thus application-dependent adjusted.

The term "spacer moieties" as used according to the present disclosure means moieties, to be more precise organic moieties, which space the linear amide linkages and/or the nitrogen-atom-containing heteromonocyclic moieties and/or the optional linear ester linkages from each other. Preferably, the nitrogen-atom-containing heteromonocyclic moieties are each spaced from each other via the spacer moieties.

Preferably, the spacer moieties are linear moieties.

More preferably, the spacer moieties are aliphatic moieties. For example, the spacer moieties may be selected from the group consisting of alkylene moieties, alkenylene moieties, alkinylene moieties and combinations of at least two of the aforesaid spacer moieties. Accordingly, the backbone chain of the polymer may also comprise different spacer moieties. Aliphatic spacer moieties are especially preferred.

Further, the backbone chain of the polymer may be free of arylic spacer moieties. Alternatively or in combination, the backbone chain of the polymer may be free of alkenylene moieties and/or alkinylene moieties.

More preferably, the spacer moieties are alkylene moieties and the backbone chain of the polymer is free of any further spacer moieties.

The spacer moieties may have a carbon chain or carbon atom chain, in particular a linear carbon chain or linear carbon atom chain, comprising 1 carbon atom to 12 carbon atoms. In particular, the carbon chain or carbon atom chain may comprise 1 carbon atom to 10 carbon atoms, in particular 1 carbon atom to 8 carbon atoms, or 2 carbon atoms to 12 carbon atoms, in particular 2 carbon atoms to 10 carbon atoms.

Further, by using small spacer moieties, that is, spacer moieties having a small carbon chain or carbon chain length, the hydrophilicity, and thus biodegradation of the polymer may be advantageously additionally improved. Accordingly, the spacer moieties may have a carbon chain or carbon atom chain, in particular a linear carbon chain or linear carbon atom chain, comprising 2 carbon atoms to 5 carbon atoms. In that, for example 2-aminoethanol and/or 1,5-diaminopentane may be employed for the synthesis of the polymer. In total, this advantageously represents a further approach of achieving a fine-tuned balance between biodegradation and sufficient mechanical strength of the polymer.

Further, also the melting point of the polymer may be advantageously influenced by the carbon chain length or carbon atom chain length of the spacer moieties. In general, the smaller an even-numbered carbon chain length or carbon atom chain length of the spacer moieties is, the higher is the melting point of the polymer.

Further, the backbone chain of the polymer may preferably contain or comprise spacer moieties being different in terms of their carbon chain length or carbon atom chain length. In particular, the backbone chain of the polymer may comprise spacer moieties having a carbon chain length or carbon atom chain length of 2 carbon atoms to 12 carbon atoms and/or spacer moieties having a carbon chain length or carbon atom chain length of 2 carbon atoms to 10 carbon atoms and/or spacer moieties having a carbon chain length or carbon atom chain length of 1 carbon atom to 10 carbon atoms and/or spacer moieties having a carbon chain length or carbon atom chain length of 1 carbon atom to 8 carbon atoms.

More preferably, at least some, in particular only some or all, of the linear amide linkages and/or the optional linear ester linkages are flanked, in particular immediately flanked, by at least one, in particular only one or two, of the spacer moieties having a carbon chain length or carbon atom chain length of 2 carbon atoms to 12 carbon atoms, by two of the spacer moieties having a carbon chain length or carbon atom chain length of 2 carbon atoms to 10 carbon atoms, or by one of the spacer moieties having a carbon chain length or carbon atom chain length of 2 carbon atoms to 12 carbon atoms and by one of the spacer moieties having a carbon chain length or carbon atom chain length of 2 carbon atoms to 10 carbon atoms.

Further preferably, at least some, in particular only some or all, of the nitrogen-atom-containing heteromonocyclic moieties are flanked, in particular immediately flanked, by at least one, in particular only one or two, of the spacer moieties having a carbon chain length or carbon atom chain length of 1 carbon atom to 10 carbon atoms, by two of the spacer moieties having a carbon chain length or carbon atom chain length of 1 carbon atom to 8 carbon atoms or by one of the spacer moieties having a carbon chain length or carbon atom chain length of 1 carbon atom to 10 carbon atoms and by one of the spacer moieties having a carbon chain length or carbon atom chain length of 1 carbon atom to 8 carbon atoms.

Further preferably, at least some, in particular only some or all, of the spacer moieties having a carbon chain length or carbon atom chain length of 2 carbon atoms to 12 carbon atoms are flanked, in particular immediately flanked, by two of the linear amide linkages, by two of the optional linear ester linkages or by one of the linear amide linkages and by one of the optional linear ester linkages.

Further preferably, at least some, in particular only some or all, of the spacer moieties having a carbon chain length or carbon atom chain length of 2 carbon atoms to 10 carbon atoms are flanked, in particular immediately flanked, by two of the linear amide linkages, by two of the optional linear ester linkages or by one of the linear amide linkages and by one of the optional linear ester linkages.

Further preferably, at least some, in particular only some or all, of the spacer moieties having a carbon chain length or carbon atom chain length of 1 carbon atom to 10 carbon atoms are flanked, in particular immediately flanked, by one of the linear amide linkages and by one of the nitrogen-atom-containing heteromonocyclic moieties or by one of the optional linear ester linkages and by one of the nitrogen-atom-containing heteromonocyclic moieties.

Further preferably, at least some, in particular only some or all, of the spacer moieties having a carbon chain length or carbon atom chain length of 1 carbon atom to 8 carbon atoms are flanked, in particular immediately flanked, by one of the linear amide linkages and by one of the nitrogen-atom-containing heteromonocyclic moieties or by one of the optional linear ester linkages and by one of the nitrogen-atom-containing heteromonocyclic moieties.

Further, the spacer moieties may have a proportion of 25% by weight to 95% by weight, in particular 50% by weight to 90% by weight, preferably 60% by weight to 80% by weight, based on the total weight of the polymer.

In a further example of the disclosure, the nitrogen-atom-containing heteromonocyclic moieties are selected from the group consisting of pyrrolidone moieties, pyridine moieties, pyrazine moieties, pyrimidine moieties, pyrrolidone derivative moieties, pyridine derivate moieties, pyrazine derivative moieties, pyrimidine derivative moieties, and combinations of at least two of the aforesaid nitrogen-atom-containing heteromonocyclic moieties.

Further, the backbone of the polymer may be free of piperazine moieties and/or piperazine derivative moieties.

Further, the backbone of the polymer may be free of cyclic imide moieties, in particular five-membered cyclic imide moieties, and/or cyclic imide derivative moieties, in particular five-membered cyclic imide derivative moieties.

The term "pyrrolidone moieties" as used according to the present disclosure refers to moieties having, that is, comprising or consisting of, an unsubstituted pyrrolidone ring.

The term "pyridine moieties" as used according to the present disclosure refers to moieties having, that is, comprising or consisting of, an unsubstituted pyridine ring.

The term "pyrazine moieties" as used according to the present disclosure refers to moieties having, that is, comprising or consisting of, an unsubstituted pyrazine ring.

The term "pyrimidine moieties" as used according to the present disclosure refers to moieties having, that is, comprising or consisting of, an unsubstituted pyrimidine ring.

The term "piperazine moieties" as used according to the present disclosure refers to moieties having, that is, comprising or consisting of, an unsubstituted piperazine ring.

The term "imide moieties" as used according to the present disclosure refers to moieties having, that is, comprising or consisting of, an unsubstituted imide ring.

The term "pyrrolidone derivative moieties" as used according to the present disclosure refers to moieties having, that is, comprising or consisting of, a pyrrolidone ring having or bearing at least one substituent, preferably at least one organic substituent (such as at least one heteroatom-containing organic substituent and/or at least one organic substituent being free of an heteroatom), in particular at least one aliphatic, that is, alkyl, alkenyl, or alkinyl, substituent and/or at least one arylic substituent. The at least one substituent may be linear and/or branched and/or non-cyclic and/or cyclic and/or may contain a ring structure. Preferably, the at least one substituent is covalently bonded or connected to ring positions/ring position 3 and/or 5 of the pyrrolidone ring.

The term "pyridine derivate moieties" as used according to the present disclosure refers to moieties having, that is, comprising or consisting of, a pyridine ring having or bearing at least one substituent, preferably at least one organic substituent (such as at least one heteroatom-containing organic sub stituent and/or at least one organic substituent being free of an heteroatom), in particular at least one aliphatic, that is, alkyl, alkenyl or alkinyl, sub stituent and/or at least one arylic substituent. The at least one substituent may be linear and/or branched and/or non-cyclic and/or cyclic and/or may contain a ring structure. Preferably, the at least one substituent is covalently bonded or connected to ring positions/ring position 3 and/or 6 of the pyridine ring.

The term "pyrazine derivate moieties" as used according to the present disclosure refers to moieties having, that is, comprising or consisting of, a pyrazine ring having or bearing at least one substituent, preferably at least one organic substituent (such as at least one heteroatom-containing organic sub stituent and/or at least one organic substituent being free of an heteroatom), in particular at least one aliphatic, that is, alkyl, alkenyl or alkinyl, sub stituent and/or at least one arylic substituent. The at least one substituent may be linear and/or branched and/or non-cyclic and/or cyclic and/or may contain a ring structure. Preferably, the at least one substituent is covalently bonded or connected to ring positions/ring position 2 and/or 5 of the pyrazine ring.

The term "pyrimidine derivate moieties" as used according to the present disclosure refers to moieties having, that is, comprising or consisting of, a pyrimidine ring having or bearing at least one substituent, preferably at least one organic substituent (such as at least one heteroatom-containing organic substituent and/or at least one organic substituent being free of an heteroatom), in particular at least one aliphatic, that is, alkyl, alkenyl or alkinyl, sub stituent and/or at least one arylic substituent. The at least one substituent may be linear and/or branched and/or non-cyclic and/or cyclic and/or may contain a ring structure. Preferably, the at least one substituent is covalently bonded or connected to ring positions/ring position 4 and/or 6 of the pyrimidine ring.

The term "piperazine derivate moieties" as used according to the present disclosure refers to moieties having, that is, comprising or consisting of, a piperazine ring having or bearing at least one substituent, preferably at least one organic substituent (such as at least one heteroatom containing organic substituent and/or at least one organic substituent being free of an heteroatom), in particular at least one aliphatic, that is, alkyl, alkenyl or alkinyl, substituent and/or at least one arylic substituent. The at least one substituent may be linear and/or branched and/or non-cyclic and/or cyclic and/or may contain a ring structure.

The term "imide derivate moieties" as used according to the present disclosure refers to moieties having, that is, comprising or consisting of, an imide ring having or bearing at least one substituent, preferably at least one organic substituent (such as at least one heteroatom containing organic substituent and/or at least one organic substituent being free of an heteroatom), in particular at least one aliphatic, that is, alkyl, alkenyl or alkinyl, substituent and/or at least one arylic substituent. The at least one substituent may be linear and/or branched and/or non-cyclic and/or cyclic and/or may contain a ring structure.

Preferably, the nitrogen-atom-containing heteromonocyclic moieties are selected from the group consisting of pyrrolidone moieties, pyridine moieties, pyrazine moieties, pyrimidine moieties and combinations of at least two of the aforesaid nitrogen-atom-containing heteromonocyclic moieties. The nitrogen-atom-containing heteromonocyclic moieties mentioned in this paragraph are especially useful in terms of an optimal biodegradation of the polymer.

More preferably, the nitrogen-atom-containing heteromonocyclic moieties are selected from the group consisting of pyrrolidone moieties, pyridine moieties, pyrazine moieties and combinations of at least two of the aforesaid nitrogen-atom-containing heteromonocyclic moieties. The nitrogen-atom-containing heteromonocyclic moieties mentioned in this paragraph are especially advantageous in terms of the polymer's biodegradation characteristic.

Especially preferably, the nitrogen-atom-containing heteromonocyclic moieties are pyrrolidone moieties. In that regard, it turned out that pyrrolidone moieties are especially advantageous with respect to the biodegradable behavior of the polymer.

Further preferably, the backbone chain of the polymer comprises at least two different repeating units.

The term "repeating units" as used according to the present disclosure refers to structural units or building blocks which are repeatedly arranged along the backbone chain of the polymer. The structural units or building blocks may be arranged randomized and/or blockwise, that is, block by block, along the backbone chain of the polymer.

In a further example of the disclosure, the backbone chain of the polymer contains or comprises repeating units being free of nitrogen-atom-containing heteromonocyclic moieties, in particular being free of any heterocyclic moieties, preferably being free of any arylic moieties, and repeating units containing or comprising at least one of the nitrogen-atom-containing heteromonocyclic moieties.

The term "repeating units being free of nitrogen-atom-containing heteromonocyclic moieties" as used according to the present disclosure may also be termed as "repeating units being free of heteromonocyclic moieties containing, that is, which contain, at least one nitrogen atom."

The term "repeating units containing or comprising at least one of the nitrogen-atom-containing heteromonocyclic moieties" as used according to the present disclosure may also be termed as "repeating units each of which containing or comprising at least one, in particular one, two or three, of the nitrogen-atom-containing heteromonocyclic moieties".

Further, each of the repeating units being free of nitrogen-atom-containing heteromonocyclic moieties, in particular being free of any heterocyclic moieties, preferably being free of any arylic moieties, preferably comprises at least one, in particular one, two or three, of the linear amide linkages and/or at least one, in particular one, two or three, of the optional linear ester linkages.

Further, each of the repeating units being free of nitrogen-atom-containing heteromonocyclic moieties, in particular being free of any heterocyclic moieties, preferably being free of any arylic moieties, preferably comprises at least one oxygen atom (O) and/or at least one "NH" (nitrogen atom bonded to hydrogen atom) and/or at least one carbonyl group of at least one of the linear amide linkages. Alternatively or in combination, each of the repeating units being free of nitrogen-atom-containing heteromonocyclic moieties, in particular being free of any heterocyclic moieties, preferably being free of any arylic moieties, preferably comprises at least one oxygen atom (O) and/or at least one "NH" (nitrogen atom bonded to hydrogen atom) and/or at least one carbonyl group of at least one of the optional linear ester linkages.

Further, each of the repeating units being free of nitrogen-atom-containing heteromonocyclic moieties, in particular being free of any heterocyclic moieties, preferably being free of any arylic moieties, preferably comprises at least one, in particular one, two, three or four, of the spacer moieties.

Further, each of the repeating units containing or comprising at least one of the nitrogen-atom-containing heteromonocyclic moieties preferably comprises at least one, in particular one or two, of the linear amide linkages and/or at least one, in particular one or two, of the optional linear ester linkages.

Further, each of the repeating units containing or comprising at least one of the nitrogen-atom-containing heteromonocyclic moieties preferably comprises at least one oxygen atom (O) and/or at least one "NH" (nitrogen atom bonded to hydrogen atom) and/or at least one carbonyl group of at least one of the linear amide linkages. Alternatively or in combination, each of the repeating units containing or comprising at least one of the nitrogen-atom-containing heteromonocyclic moieties preferably comprises at least one oxygen atom (O) and/or at least one "NH" (nitrogen atom bonded to hydrogen atom) and/or at least one carbonyl group of at least one of the optional linear ester linkages.

Further, each of the repeating units containing or comprising at least one of the nitrogen-atom-containing heteromonocyclic moieties preferably comprises at least one, in particular one, two, three or four, of the spacer moieties.

Further, the repeating units being free of nitrogen-atom-containing heteromonocyclic moieties, in particular being free of any heterocyclic moieties, preferably being free of any arylic moieties, or at least some of them may be arranged in a randomized and/or blockwise, that is, block by block, fashion along the backbone chain of the polymer. Further, the repeating units containing or comprising at least one of the nitrogen-atom-containing heteromonocyclic moieties or at least some of them may be arranged in a randomized and/or blockwise, that is, block by block, fashion along the backbone chain of the polymer. Further, the repeating units being free of nitrogen-atom-containing heteromonocyclic moieties, in particular being free of any heterocyclic moieties, preferably being free of any arylic moieties, and the repeating units containing or comprising at least one of the nitrogen-atom-containing heteromonocyclic moieties may be arranged in an alternating fashion along the backbone chain of the polymer. Preferably, the backbone chain of the polymer is free of any other type of repeating units being different from the aforementioned repeating units.

Preferably, the repeating units being free of nitrogen-atom-containing heteromonocyclic moieties, in particular being free of any heterocyclic moieties, preferably being free of any arylic moieties, and the repeating units containing or comprising at least one of the nitrogen-atom-containing heteromonocyclic moieties further contain or comprise spacer moieties.

More preferably, the spacer moieties of the repeating units being free of nitrogen-atom-containing heteromonocyclic moieties, in particular being free of any heterocyclic moieties, preferably being free of any arylic moieties, are alkylene moieties. The alkylene moieties may in particular have a carbon chain length or carbon atom chain length of 1 carbon atom to 12 carbon atoms, in particular 1 carbon to 10 carbon atoms. For example, the carbon chain length or carbon atom chain length may comprise 2 carbon atoms to 12 carbon atoms, in particular 2 carbon atoms to 10 carbon atoms.

Further, the repeating units being free of nitrogen-atom-containing heteromonocyclic moieties, in particular being free of any heterocyclic moieties, preferably being free of any arylic moieties, may have spacer moieties, in particular alkylene moieties, having a different carbon chain length or carbon atom chain length. For example, the repeating units being free of nitrogen-atom-containing heteromonocyclic moieties, in particular being free of heterocyclic moieties, preferably being free of arylic moieties, may contain or comprise spacer moieties having a carbon chain length or carbon atom chain length of 2 carbons atom to 12 carbon atoms and spacer moieties having a carbon chain length or carbon atom chain length of 2 carbon atoms to 10 carbon atoms.

Further preferably, the spacer moieties of the repeating units containing or comprising at least one of the nitrogen-atom-containing heteromonocyclic moieties are alkylene moieties, in particular having a carbon chain length or carbon atom chain length of 1 carbon atom to 12 carbon atoms, in particular 1 carbon atom to 10 carbon atoms, in particular 1 carbon atom to 8 carbon atoms.

Further, the repeating units containing or comprising at least one of the nitrogen-atom-containing heteromonocyclic moieties may have spacer moieties, in particular alkylene moieties, having a different carbon chain length or carbon atom chain length. For example, the repeating units containing or comprising at least one of the nitrogen-atom-containing heteromonocyclic moieties may contain or comprise spacer moieties having a carbon chain length or carbon atom chain length of 1 carbon atom to 8 carbon atoms and spacer moieties having a carbon chain length or carbon atom chain length of 1 carbon atom to 7 carbon atoms.

In a further example of the disclosure, the number of the repeating units being free of nitrogen-atom-containing heteromonocyclic moieties, in particular being free of any heterocyclic moieties, preferably being free of any arylic moieties, is higher than the number of the repeating units containing or comprising at least one of the nitrogen-atom-containing heteromonocyclic moieties.

In a further example of the disclosure, based on the total number of the repeating units of the polymer, every fifteenth to second, in particular every fifteenth to third, in particular every tenth to third, repeating unit contains or comprises at least one, in particular one or two, preferably only one or only two, of the nitrogen-atom-containing heteromonocyclic moieties.

In a further example of the disclosure, the repeating units being free of nitrogen-atom-containing heteromonocyclic moieties, in particular being free of any heterocyclic moieties, preferably being free of any arylic moieties, have the formula I below:

formula I

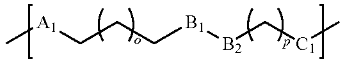

where o is 0 or an integer of 1 to 10, that is, 1, 2, 3, 4, 5, 6, 7, 8, 9, or 10, in particular 1 to 8, that is, 1, 2, 3, 4, 5, 6, 7, or 8, p is an integer of 1 to 10, that is, 1, 2, 3, 4, 5, 6, 7, 8, 9, or 10, in particular 1 to 8, that is, 1, 2, 3, 4, 5, 6, 7, or 8, $A_1$ is C═O (carbonyl group), NH, or O, $B_1$ is C═O (carbonyl group) and $B_2$ is NH or O, or $B_1$ is NH or O and $B_2$ is C═O (carbonyl group) and $C_1$ is C═O (carbonyl group), NH, or O.

Preferably, in formula I, o is 4, p is 8, $A_1$ is NH, $B_1$ is NH, $B_2$ is C═O, and $C_1$ is C═O.

Further, the polymer or backbone chain of the polymer may comprise a combination of different repeating units according to formula I. Preferably, the repeating units are different in terms of the alkylene groups and/or the position of the alkylene groups and/or the position of C═O (carbonyl group) and/or the position of NH and/or the position of O.

Further, apart from the repeating units according to formula I, the polymer or backbone chain of the polymer may be free of any further repeating units being free of nitrogen-atom-containing heteromonocyclic moieties, in particular being free of any heterocyclic moieties, preferably being free of any arylic moieties.

In a further example of the disclosure, the repeating units containing or comprising at least one of the nitrogen-atom-containing heteromonocyclic moieties have the formula II below:

formula II

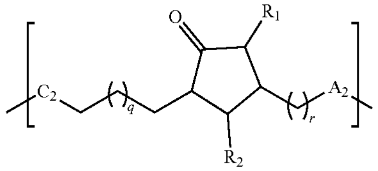

where q and r are identical or different and are independently from each other 0 or an integer of 1 to 10, that is, 1, 2, 3, 4, 5, 6, 7, 8, 9, or 10, in particular 1 to 8, that is, 1, 2, 3, 4, 5, 6, 7, or 8, $A_2$ is C═O (carbonyl group), NH, or O, $C_2$ is C═O (carbonyl group), NH, or O and $R_1$ and $R_2$ are identical or different and are independently from each other H and/or alkyl and/or aryl.

Preferably, in formula II, q is 4, r is 0, $A_2$ is C═O, $C_2$ is NH, $R_1$ is H, and $R_2$ is H.

Further, the polymer or backbone chain of the polymer may comprise a combination of different repeating units according to formula II.

Further, apart from the repeating units according to formula II, the polymer or backbone chain of the polymer may be free of any further repeating units containing or comprising nitrogen-atom-containing heteromonocyclic moieties, in particular comprising or containing heterocyclic moieties, in particular comprising or containing arylic moieties.

Further, the repeating units containing or comprising at least one of the nitrogen atom-containing-heteromonocyclic moieties may preferably have the formula IP below:

formula II#

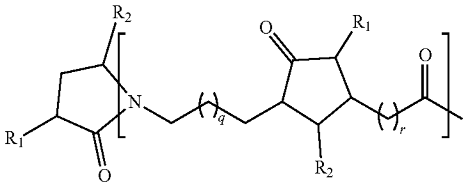

where q and r are identical or different and are independently from each other 0 or an integer of 1 to 10, that is, 1, 2, 3, 4, 5, 6, 7, 8, 9 or 10, in particular 1 to 8, that is, 1, 2, 3, 4, 5, 6, 7 or 8, and $R_1$ and $R_2$ are identical or different and are independently from each other H and/or alkyl and/or aryl.

Preferably, q is 4, r is 0, $R_1$ is H, and $R_2$ is H.

In a further example of the disclosure, the repeating units containing or comprising at least one of the nitrogen-atom-containing heteromonocyclic moieties have the formula III below:

formula III

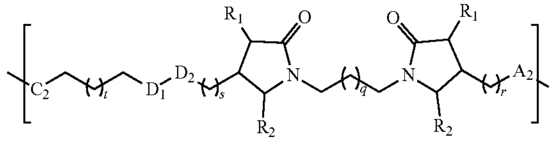

where q, r, s, and t are identical or different and are independently from each other 0 or an integer of 1 to 10, that is, 1, 2, 3, 4, 5, 6, 7, 8, 9, or 10, in particular 1 to 8, that is, 1, 2, 3, 4, 5, 6, 7, or 8, $A_2$ is C═O (carbonyl group), NH, or O, $C_2$ is C═O (carbonyl group), NH, or O, $D_1$ is C═O (carbonyl group) and $D_2$ is NH or O, or $D_1$ is NH or O and $D_2$ is C═O (carbonyl group) and $R_1$ and $R_2$ are identical or different and are independently from each other H and/or alkyl and/or aryl.

Preferably, in formula III, q is 4, r is 0, s is 0, t is 4, $A_2$ is C═O, $C_2$ is NH, $D_1$ is NH, $D_2$ is C═O, $R_1$ is H, and $R_2$ is H.

Further, the backbone chain of the polymer may contain or comprise repeating units according to formula II and/or repeating units according to formula IP and/or repeating units according to formula III.

In a further example of the disclosure, the repeating units containing or comprising at least one of the nitrogen-atom-containing heteromonocyclic moieties have the formula IV below:

formula IV

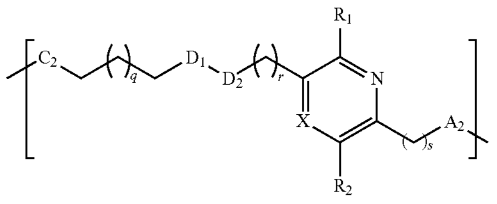

where q, r, and s are identical or different and are independently from each other 0 or an integer of 1 to 10, that is, 1, 2, 3, 4, 5, 6, 7, 8, 9, or 10, in particular 1 to 8, that is, 1, 2, 3, 4, 5, 6, 7, or 8, $A_2$ is C═O (carbonyl group), NH, or O, $C_2$ is C═O (carbonyl group), NH, or O, $D_1$ is C═O (carbonyl group) and $D_2$ is NH or O, or $D_1$ is NH or O and $D_2$ is C═O (carbonyl group), X is N or CH and $R_1$ and $R_2$ are identical or different and are independently from each other H and/or alkyl and/or aryl.

Preferably, in formula IV, q is 3 or 4, r is 0, s is 0, $A_2$ is C═O, $C_2$ is NH, $D_1$ is NH, $D_2$ is C═O, $R_1$ is H, and $R_2$ is H.

Further, the polymer or backbone chain of the polymer may comprise a combination of different repeating units according to formula IV.

Further, apart from the repeating units according to formula IV, the polymer or backbone chain of the polymer may be free of any further repeating units containing or comprising nitrogen-atom-containing heteromonocyclic moieties, in particular comprising or containing heterocyclic moieties, in particular comprising or containing arylic moieties. Further, the repeating units containing or comprising at least one of the nitrogen-atom-containing heteromonocyclic moieties may preferably have the formula V below:

formula V

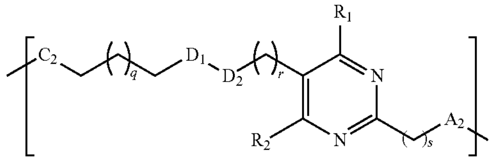

where q, r, and s are identical or different and are independently from each other 0 or an integer of 1 to 10, that is, 1, 2, 3, 4, 5, 6, 7, 8, 9, or 10, in particular 1 to 8, that is, 1, 2, 3, 4, 5, 6, 7, or 8, $A_2$ is C═O (carbonyl group), NH, or O, $C_2$ is C═O (carbonyl group), NH, or O, $D_1$ is C═O (carbonyl group) and $D_2$ is NH or O, or $D_1$ is NH or O and $D_2$ is C═O (carbonyl group), $R_1$ and $R_2$ are identical or different and are independently from each other H and/or alkyl and/or aryl.

Preferably, in formula V, q is 4, r is 0, s is 0, $A_2$ is C═O, $C_2$ is NH, $D_1$ is NH, $D_2$ is C═O, $R_1$ is H, and $R_2$ is H.

Further, the polymer or backbone chain of the polymer may comprise a combination of different repeating units according to formula V.

Further, apart from the repeating units according to formula V, the polymer or backbone chain of the polymer may be free of any further repeating units containing or comprising nitrogen-atom-containing heteromonocyclic moieties, in particular comprising or containing heterocyclic moieties, in particular comprising or containing arylic moieties.

Further, the polymer or backbone chain of the polymer may comprise the repeating units containing or comprising at least one of the nitrogen-atom-containing heteromonocyclic moieties according to formula II and/or the repeating units containing or comprising at least one of the nitrogen-atom-containing heteromonocyclic moieties according to formula IP and/or the repeating units containing or comprising at least one of the nitrogen-atom-containing heteromonocyclic moieties according to formula III and/or the repeating units containing or comprising at least one of the nitrogen-atom-containing heteromonocyclic moieties according to formula IV and/or the repeating units containing or comprising at least one of the nitrogen-atom-containing heteromonocyclic moieties according to formula V.

In a further example of the disclosure, the backbone chain of the polymer, in particular except the ends of the backbone chain, at least partly, in particular only partly or exclusively, comprises or has the formula VI below:

formula VI

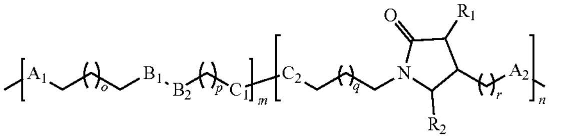

where

- m>n with the proviso that n is >o,
- o, q, and r are identical or different and are independently from each other 0 or an integer of 1 to 10, that is, 1, 2, 3, 4, 5, 6, 7, 8, 9, or 10, in particular 1 to 8, that is, 1, 2, 3, 4, 5, 6, 7, or 8,
- p is an integer of 1 to 10, that is, 1, 2, 3, 4, 5, 6, 7, 8, 9, or 10, in particular 1 to 8, that is, 1, 2, 3, 4, 5, 6, 7, or 8,
- $A_1$ is C═O (carbonyl group) and $A_2$ is NH or O, or $A_1$ is NH or O and $A_2$ is C═O (carbonyl group),
- $B_1$ is C═O (carbonyl group) and $B_2$ is NH or O, or $B_1$ is NH or O and $B_2$ is C═O (carbonyl group),
- $C_1$ is C═O (carbonyl group) and $C_2$ is NH or O, or $C_1$ is NH or O and $C_2$ is C═O (carbonyl group) and
- $R_1$ and $R_2$ are identical or different and are independently from each other H and/or alkyl and/or aryl.

Preferably, in formula VI, o is 4, p is 8, q is 4, r is 0, $A_1$ is NH, $A_2$ is C═O, $B_1$ is NH, $B_2$ is C═O, $C_1$ is C═O, $C_2$ is NH, $R_1$ is H. and $R_2$ is H.

In a further example of the disclosure, the backbone chain of the polymer, in particular except the ends of the backbone chain, at least partly, in particular only partly or exclusively, comprises or has the formula VII below:

formula VII

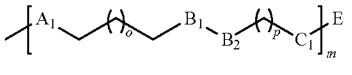

where

E has the following formula VIII formula VIII

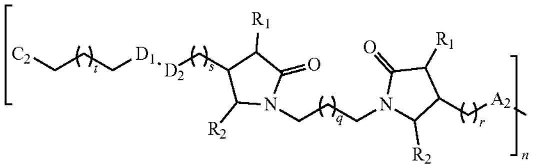

where (in formulae VII and VIII)

- m>n with the proviso that n is >0,
- o, q, r, s, and t are identical or different and are independently from each other 0 or an integer of 1 to 10, that is, 1, 2, 3, 4, 5, 6, 7, 8, 9, or 10, in particular 1 to 8, that is, 1, 2, 3, 4, 5, 6, 7, or 8,
- p is an integer of 1 to 10, that is, 1, 2, 3, 4, 5, 6, 7, 8, 9, or 10, in particular 1 to 8, that is, 1, 2, 3, 4, 5, 6, 7, or 8,
- $A_1$ is C═O (carbonyl group) and $A_2$ is NH or O, or $A_1$ is NH or O and $A_2$ is C═O (carbonyl group),
- $B_1$ is C═O (carbonyl group) and $B_2$ is NH or O, or $B_1$ is NH or O and $B_2$ is C═O (carbonyl group),
- $C_1$ is C═O (carbonyl group) and $C_2$ is NH or O, or $C_1$ is NH or O and $C_2$ is C═O (carbonyl group),
- $D_1$ is C═O (carbonyl group) and $D_2$ is NH or O, or $D_1$ is NH or O and $D_2$ is C═O (carbonyl group) and
- $R_1$ and $R_2$ are identical or different and are independently from each other H and/or alkyl and/or aryl.

Preferably, in formulae VII and VIII, o is 4, p is 8, q is 4, r is 0, s is 0, $A_1$ is NH, $A_2$ is C═O, $B_1$ is NH, $B_2$ is C═O, $C_1$ is C═O, $C_2$ is NH, $D_1$ is NH $D_2$ is C═O, $R_1$ is H, and $R_2$ is H.

In a further example of the disclosure, the backbone chain of the polymer, in particular except the ends of the backbone chain, at least partly, in particular only partly or exclusively, comprises or has the formula IX below:

formula IX

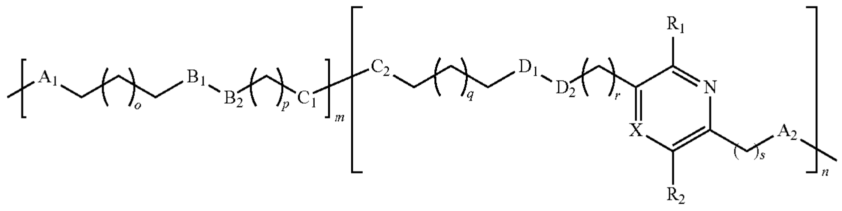

where m>n with the proviso that n is >0, o, q, r, and s are identical or different and are independently from each other 0 or an integer of 1 to 10, that is, 1, 2, 3, 4, 5, 6, 7, 8, 9, or 10, in particular 1 to 8, that is, 1, 2, 3, 4, 5, 6, 7, or 8, p is an integer of 1 to 10, that is, 1, 2, 3, 4, 5, 6, 7, 8, 9, or 10, in particular 1 to 8, that is, 1, 2, 3, 4, 5, 6, 7, or 8, $A_1$ is C═O (carbonyl group) and $A_2$ is NH or O, or $A_1$ is NH or O and $A_2$ is C═O (carbonyl group), $B_1$ is C═O (carbonyl group) and $B_2$ is NH or O, or $B_1$ is NH or O and $B_2$ is C═O (carbonyl group), $D_1$ is C═O (carbonyl group) and $D_2$ is NH or O, or $D_1$ is NH or O and $D_2$ is C═O (carbonyl group) and $R_1$ and $R_2$ are identical or different and are independently from each other H and/or alkyl and/or aryl.

Preferably, in formula X, o is 4, p is 8, q is 4, r is 0, s is 0, $A_1$ is NH, $A_2$ is C═O, $B_1$ is NH, $B_2$ is C═O, $C_1$ is C═O, $C_2$ is NH, $D_1$ is NH, $D_2$ is C═O, $R_1$ is H, and $R_2$ is H.

Further, the backbone chain of the polymer, in particular except the ends of the backbone chain, at least partly, in particular only partly, may preferably comprise or has the formula XIa below:

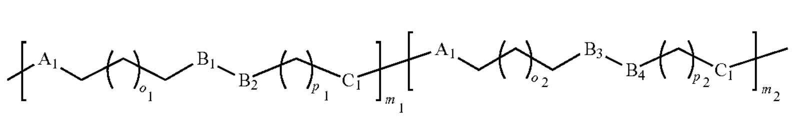
formula XIa $C_1$ is C═O (carbonyl group) and $C_2$ is NH or O, or $C_1$ is NH or O and $C_2$ is C═O (carbonyl group), $D_1$ is C═O (carbonyl group) and $D_2$ is NH or O, or $D_1$ is NH or O and $D_2$ is C═O (carbonyl group), X is N or CH and $R_1$ and $R_2$ are identical or different and are independently from each other H and/or alkyl and/or aryl.

Preferably, in formula IX, o is 4, p is 8, q is 4, r is 0, s is 0, $A_1$ is NH, $A_2$ is C═O, $B_1$ is NH, $B_2$ is C═O, $C_1$ is C═O, $C_2$ is NH, $D_1$ is NH, $D_2$ is C═O, $R_1$ is H, and $R_2$ is H.

Further, the backbone chain of the polymer, in particular except the ends of the backbone chain, at least partly, in particular only partly or exclusively, may preferably comprise or has the formula X below:

where $m_1$ is a first repeating unit according to formula XIa and $m_2$ is a second repeating unit according to formula XIa, $o_1$ and $o_2$ are identical or different and are independently from each other 0 or an integer of 1 to 10, that is, 1, 2, 3, 4, 5, 6, 7, 8, 9, or 10, in particular 1 to 8, that is, 1, 2, 3, 4, 5, 6, 7, or 8, $p_1$ and $p_2$ are identical or different and are independently from each an integer of 1 to 10, that is, 1, 2, 3, 4, 5, 6, 7, 8, 9, or 10, in particular 1 to 8, that is, 1, 2, 3, 4, 5, 6, 7, or 8,

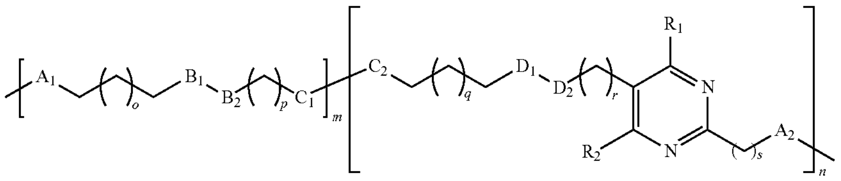
formula X where m>n with the proviso that n is >0, o, q, r, and s are identical or different and are independently from each other 0 or an integer of 1 to 10, that is, 1, 2, 3, 4, 5, 6, 7, 8, 9, or 10, in particular 1 to 8, that is, 1, 2, 3, 4, 5, 6, 7, or 8, p is an integer of 1 to 10, that is, 1, 2, 3, 4, 5, 6, 7, 8, 9, or 10, in particular 1 to 8, that is, 1, 2, 3, 4, 5, 6, 7, or 8, $A_1$ is C═O (carbonyl group) and $A_2$ is NH or O, or $A_1$ is NH or O and $A_2$ is C═O (carbonyl group), $B_1$ is C═O (carbonyl group) and $B_2$ is NH or O, or $B_1$ is NH or O and $B_2$ is C═O (carbonyl group), $C_1$ is C═O (carbonyl group) and $C_2$ is NH or O, or $C_1$ is NH or O and $C_2$ is C═O (carbonyl group), $A_1$ and $C_1$ are different and independently from each other C═O (carbonyl group), NH, or O and $B_1$ is C═O (carbonyl group) and $B_2$ is NH or O, or $B_1$ is NH or O and $B_2$ is C═O (carbonyl group) and $B_3$ is C═O (carbonyl group) and $B_4$ is NH or O, or $B_3$ is NH or O and $B_4$ is C═O (carbonyl group).

Preferably, in formula XIa, $o_1$ is 4, $o_2$ is 3, $p_1$ is 8, $p_2$ is 5, $A_1$ is NH, $B_1$ is NH, $B_2$ is C═O, $C_1$ is C═O, $B_3$ is C═O. and $B_4$═NH.

Further, the backbone chain of the polymer, in particular except the ends of the backbone chain, at least partly, in particular only partly, may preferably comprise or has the formula XIb below:

formula XIb

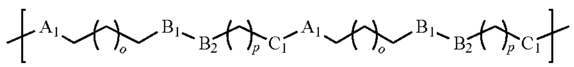

where o is 0 or an integer of 1 to 10, that is, 1, 2, 3, 4, 5, 6, 7, 8, 9, or 10, in particular 1 to 8, that is, 1, 2, 3, 4, 5, 6, 7, or 8, p is an integer of 1 to 10, that is, 1, 2, 3, 4, 5, 6, 7, 8, 9, or 10, in particular 1 to 8, that is, 1, 2, 3, 4, 5, 6, 7, or 8, $A_1$ and $C_1$ are different and independently from each other C═O (carbonyl group), NH, or O and $B_1$ is C═O (carbonyl group) and $B_2$ is NH or O, or $B_1$ is NH or O and $B_2$ is C═O (carbonyl group).

Preferably, in formula XIb, o is 4, p is 8, $A_1$ is NH, $B_1$ is NH, $B_2$ is C═O, and $C_1$ is C═O.

Further, the backbone chain of the polymer, in particular except the ends of the backbone chain, at least partly, in particular only partly, may preferably comprise or has the formula XII below:

formula XII

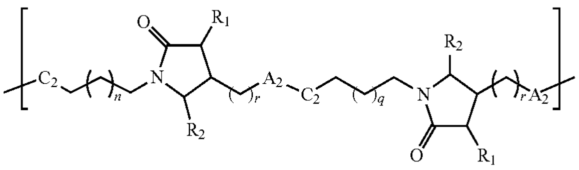

where q and r are identical or different and are independently from each other 0 or an integer of 1 to 10, that is, 1, 2, 3, 4, 5, 6, 7, 8, 9, or 10, in particular 1 to 8, that is, 1, 2, 3, 4, 5, 6, 7, or 8, $A_2$ and $C_2$ are different and independently from each other C═O (carbonyl group), NH, or O and $R_1$ and $R_2$ are identical or different and are independently from each other H and/or alkyl and/or aryl.

Preferably, in formula II, q is 4, r is 0, $A_2$ is C═O, $C_2$ is NH, $R_1$ is H, and $R_2$ is H.

Further, the backbone chain of the polymer, in particular except the ends of the backbone chain, at least partly, in particular only partly, may preferably comprise or has the formula XIII below:

formula XIII

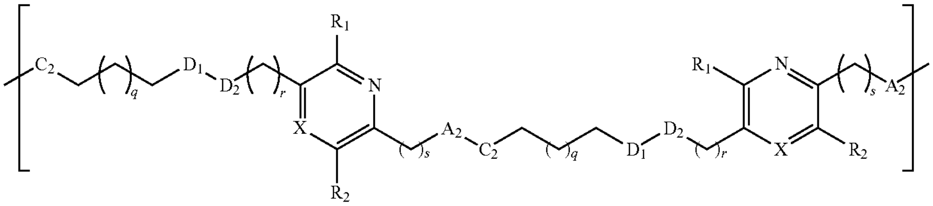

where q, r, and s are identical or different and are independently from each other 0 or an integer of 1 to 10, that is, 1, 2, 3, 4, 5, 6, 7, 8, 9, or 10, in particular 1 to 8, that is, 1, 2, 3, 4, 5, 6, 7, or 8, $A_2$ and $C_2$ are different and independently from each other C═O (carbonyl group), NH, or O, $D_1$ is C═O (carbonyl group) and $D_2$ is NH or O, or $D_1$ is NH or O and $D_2$ is C═O (carbonyl group), X is N or CH and $R_1$ and $R_2$ are identical or different and are independently from each other H and/or alkyl and/or aryl.

Preferably, in formula XIII, q is 4, r is 0, s is 0, $A_2$ is C═O, $C_2$ is NH, $D_1$ is NH, $D_2$ is C═O, $R_1$ is H, and $R_2$ is H.

Further, the backbone chain of the polymer, in particular except the ends of the backbone chain, at least partly, in particular only partly, may preferably comprise or has the formula XIV below:

formula XIV

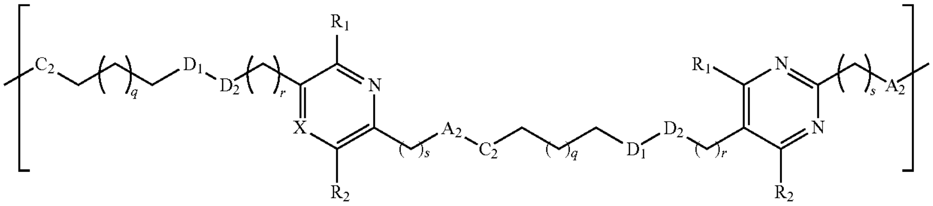

where q, r, and s are identical or different and are independently from each other 0 or an integer of 1 to 10, that is, 1, 2, 3, 4, 5, 6, 7, 8, 9, or 10, in particular 1 to 8, that is, 1, 2, 3, 4, 5, 6, 7, or 8, $A_2$ and $C_2$ are different and independently from each other C═O (carbonyl group), NH, or O, $D_1$ is C═O (carbonyl group) and $D_2$ is NH or O, or $D_1$ is NH or O and Da is C═O (carbonyl group) and $R_1$ and $R_2$ are identical or different and are independently from each other H and/or alkyl and/or aryl.

Preferably, in formula XIV, q is 4, r is 0, s is 0, $A_2$ is C═O, $C_2$ is NH, $D_1$ is NH, $D_2$ is C═O, $R_1$ is H, and $R_2$ is H.

More preferably, the polymer according to the present disclosure may be manufactured or synthesized by polymerization of hexanedioic acid, 1,4-butanediol, 1,5-diaminopentane, and 1,1'-(hexane-1,6-diyl)bis(5-oxopyrrolidine-3-carboxylic acid).

Alternatively, the polymer according to the present disclosure may be preferably manufactured or synthesized by polymerization of decanedioic acid, 1,4-butanediol, 1,5-diaminopentane, and 1-(5-carboxypentyl)-5-oxopyrrolidine-3-carboxylic acid.

Alternatively, the polymer according to the present disclosure may be preferably manufactured or synthesized by polymerization of nonanedioic acid, 1,4-butanediol, 1,6-diaminohexane, and pyrazine-2,5-dicarboxylic acid.

Alternatively, the polymer according to the present disclosure may be preferably manufactured or synthesized by polymerization of decanedioic acid, 1,4-butanediol, 1,6-diaminohexane, and 1,1'-(hexane-1,6-diyl)bis(5-oxopyrrolidine-3 -carboxylic acid).

Alternatively, the polymer according to the present disclosure may be preferably manufactured or synthesized by polymerization of nonanedioic acid, 1,6-diaminohexane, and 1,1'-(hexane-1,6-diyl)bis(5-oxopyrrolidine-3 -carboxylic acid).

Alternatively, the polymer according to the present disclosure may be preferably manufactured or synthesized by polymerization of hexanedioic acid, 1,6-hexanediol, 1,5-diaminopentane, 1,1'-(hexane-1,6-diyl)bis(5-oxopyrrolidine-3-carboxylic acid), and pyrazine-2,5-dicarboxylic acid.

Further, the polymer may be preferably manufactured or synthesized without using triamines and/or tetraamines as monomers. In particular, the polymer may be manufactured or synthesized by using diamines as only amine monomers.

Further, the polymer may be preferably manufactured or synthesized without using succinate as monomer and/or without using succinate containing monomers.

In a further example of the disclosure, the polymer has a degradation rate, in particular in high dispersed phase, determined according to ASTM 5988-18, of 5 $mg_{plastic}/kg_{soil}$·month to 500 $mg_{plastic}/kg_{soil}$·month, in particular 50 $mg_{plastic}/kg_{soil}$·month to 250 $mg_{plastic}/kg_{soil}$·month, preferably 100 $mg_{plastic}/kg_{soil}$·month to 200 $mg_{plastic}/kg_{soil}$·month.

In a further example of the disclosure, the polymer has a mechanical strength, in particular tensile strength, determined according to ASTM $D_{2256}$ (filaments) and ASTM $D_{638}$ (bars), of 50 MPa to 500 MPa, in particular 75 MPa to 300 MPa, preferably 100 MPa to 200 MPa.

Further, the polymer preferably has a melting point of ≥150° C., in particular ≥180° C., preferably 180° C. to 240° C. Thus, the polymer may be advantageously applicable in many technical fields where heat is generated, for example by friction, without having the risk that an application-dependent functionality of the polymer is impaired by melting.

Further, the polymer may have a molecular weight, in particular an average molecular weight, determined according to ASTM $D_{5296}$, of 5 kDa to 500 kDa, in particular 10 kDa to 100 kDa, preferably 20 kDa to 50 kDa. Due to the high molecular weight, the polymer according to the present disclosure is advantageously suitable for the most of thermoplastic manufacturing methods as for example extrusion, injection molding and blow molding. Despite the relatively high molecular weight, there is a fine-tuned and in particular application-dependent balance between biodegradability and mechanical strength of the polymer achievable.

Preferably, the polymer exhibits a viscosity and a melting point being comparable to commonly used polyamide or polyamide copolymers. Thus, advantageously, existing manufacturing equipment can be used. Therefore, products and articles comprising or consisting of the inventive polymer may be produced both ecologically and economically. Further, the polymer may have a polydispersity index or value ($M_w/M_n$, where $M_w$ is the weight-average molar mass and $M_n$ is the number-average molar mass) of 1 to 5, in particular 1 to 3, preferably 1 to 2.

Further, the polymer may have a crystallinity, determined according to ASTM $D_{3418}$-12, of 20 J/g to 120 J/g, in particular 30 J/g to 110 J/g, preferably 40 J/g to 100 J/g.

Further, the polymer may have a relative viscosity, determined according to ASTM 789-19, of 1.6 to 4.4, in particular 2.0 to 4.0, preferably 2.4 to 3.6.

Further, the polymer according to the present disclosure is preferably not part of a polymer blend, that is, a mixture of different polymers.

Alternatively, the polymer according to the present disclosure may be part of a polymer blend, wherein the polymer blend—along the polymer according to the present disclosure—comprises at least one further polymer.

Further, the polymer may comprise amino acid moieties.

Further, the polymer may comprise aminoalkanoic acid moieties. More preferably, the polymer is free of any ε-aminocaproic acid moieties.

According to a second aspect, the present disclosure relates to a product or article comprising or consisting of a polymer according to the first aspect of the disclosure.

In particular, at least a part of the surface of the product or article may consist of the polymer. Preferably, the whole surface of the product or article may consist of the polymer.

Preferably, the product or article has an elongated shape and at least one cross-section through the product or article may consist of the polymer. Preferably, the product or article is a tool and the cross-section is a cross-section in which mechanical loads occur during application of the tool. The tool is preferably a cutting tool such as a trimmer line or cutting blade on which inter alia tensile force (centrifugal force) acts, or a fishing net on which inter alia tensile force acts.

Further, the product or article may be preferably free of any core-sheath structure, in particular as described at the example of a trimmer line in U.S. Pat. No. 6,061,914 A. In the state of the art, the core consists of a biodegradable material wherein the sheath is made of a non-biodegradable or less biodegradable material. The sheath protects the core from unwanted degradation. Furthermore, the sheath bears the main part of the occurring loads.

Preferably, the product or article is a product or an article being exposed or exposable to moisture and/or water. With respect to such products and articles, respectively, the polymer according to the disclosure is especially advantageous inasmuch as said polymer allows for adjusting a fine balance between biodegradation behavior and mechanical strength, which is a prerequisite for the applicability of such products and articles, respectively.

In particular, the product or article may have a surface/volume ratio of 3 $m^{-1}$ to 2,000,000 $m^{-1}$, in particular 5 $m^{-1}$ to 1,000,000 $m^{-1}$, preferably 10 $m^{-1}$ to 500,000 $m^{-1}$. Preferably, the product or article is an elongated product or article. More preferably, the product or article is selected from the group consisting of trimmer line, plastic cutting blade, monofilament, multifilament such as a yarn or twine, textile fabric, fishing net, compound, injection molded part, blow-molded part, cast molded part, extrusion molded product/part, film, and sheet.

The above-mentioned plastic cutting blade is preferably suitable for mowing heads.

The above-mentioned multifilament products are preferably suitable for strong fiber products wearing out and becoming biodegradable in a controlled way by means of the disclosure. Examples can be technical textiles, carpets, horticultural twines, bale twines, and fishery gear.

The term "compound" as used according to the present disclosure refers to a composition or mixture comprising a polymer according to the first aspect of the disclosure.

The product or article, apart from the polymer according to the first aspect of the disclosure, may be free of any further polymer.

Furthermore, the product or article may be free of a plasticizer and/or degradation promoting additive and/or fibers, in particular natural fibers such as cellulose or starch fibers.

Furthermore, the product or article may comprise an additive, in particular a non-polymeric additive. The additive is preferably selected from the group consisting of a salt, a colorant, and combinations of at least two of the aforesaid additives.

The salt may be selected from the group consisting of ammonium salt, phosphate, sodium salt, potassium salt, and mixtures of at least two of the aforesaid salts.

The colorant may be for example a masterbatch, that is, a color concentrate, in particular a biodegradable masterbatch. A respective masterbatch is, for example, commercially available under the name PolyOne. Further, the colorant, in particular the masterbatch, may have a maximum proportion of 4% by weight, based on the total weight of the product or article.

Further, the product or article may be in a stretched form. By stretching, in particular under heat, and preferably in several stretching steps, the macromolecules of the inventive polymer may be advantageously additionally parallelized. This results in an additional increase in crystallinity. For example, a product or article may have a crystallinity, determined according to ASTM $D_{3418}$-12, of 40 J/g to 140 J/g, in particular 50 J/g to 130 J/g, preferably 60 J/g to 120 J/g.

Further, the product or article is preferably compostable, preferably under environmental conditions, in particular at a temperature of 10° C. to 40° C., in particular 15° C. to 30° C., preferably 18° C. to 28° C., and/under the influence of environmental moisture. Thus, industrial composting may be advantageously not necessary.

In a further example of the disclosure, the product or article is a trimmer line or at least one plastic cutting blade, that is, one plastic cutting blade or a plurality of plastic cutting blade, in particular for a mowing head. With respect to these products and articles, respectively there is an especially demand for a fine-tuned balance between biodegradation and mechanical strength, since on the one hand, these products and articles, respectively are frequently exposed to moisture and/or water and/or plant juice and on the other hand a sufficient mechanical strength during their operation is highly desired. Especially preferably, the product or article is a trimmer line.

The term "trimmer line" as used according to the present disclosure refers to a thread, in particular monofilament for trimming or cutting vegetation, for example lawns and/or meadows, in particular edges of lawns and/or meadows. The trimmer line can be used in motorized rotary-head cultivation implements, commonly known as brush cutters and edge trimmers. These implements are generally fitted with a combustion engine or electric motor which rotates at a high speed which may be between about 3000 revolutions per minute and 12000 revolutions per minute, a rotary cutting head which carries one or more trimmer lines. As the head rotates, and under the effect of centrifugal force, the trimmer line or trimmer lines splay out radially and thus sweep a certain circular area, within which they have the effect of cutting the vegetation they encounter. The "trimmer line" according to the present disclosure may also be termed as "cutting line" or "mowing line".

The term "cutting blade" as used according to the present disclosure refers to a tool which could be used on a brush cutter or edge trimmer instead or additionally to the trimmer line as previously described or to a lawnmower, autonomous mower, or similar product suitable for clearing, mowing ,or trimming applications, preferably of vegetation.

Regarding a trimmer line, the present disclosure additionally addresses the following problems. Typically, the trimmer line is contained, in particular rolled-up, in the form of a reel or spool within a casing of the above-mentioned motorized rotary-head cultivation implements and the trimmer line exits the casing via an eyelet of the casing. Due to the centrifugal forces during operation friction occurs to some extent between the trimmer line and surfaces and/or edges of the eyelet resulting in heat generation which may cause at worst melting and thus weakening of the trimmer line. A further problem is that windings of the trimmer line within the casing of the motorized rotary-head cultivation implements are prone to mutual welding under specific circumstances. Due to the superior properties, in particular due to the melting point, of the polymer according to the present disclosure, the aforementioned problems can be advantageously circumvented or at least reduced by the trimmer line according to the present disclosure.

Further, the trimmer line may have any conceivable cross-section or profile. In particular, there is no need for a specific whatsoever cross-section or profile in order to accomplish a certain level of biodegradability or cutting performance. Accordingly, the trimmer line may, for example, have circular, polygonal, or star-shaped cross-section.

Further, the trimmer line may have a multi-layer structure. Preferably, each of the layers form or build part of a surface of the structure or trimmer line. More preferably, each layer of the structure comprises or consists of the polymer according to the present disclosure. Further, the layers may be equally or different colored.

Further, the trimmer line may be free of any biodegradation promoting additives.

Further, the trimmer line may be free of any protection or exterior layer, in particular any protection or exterior layer of low biodegradable or non-biodegradable material.

Further, the trimmer line may be free of any reinforcing means, in particular any reinforcing fibres.

With respect to further features and advantages of the product or article, reference is made to the previous description. The features and advantages described in the previous description, in particular with respect to the polymer according to the present disclosure, apply, mutatis mutandis, with respect to the product or article according to the second aspect of the disclosure.

According to a third aspect, the disclosure relates to the use of a polymer according to the first aspect of the disclosure for manufacturing or producing a product or article according to the second aspect of the disclosure.

With respect to further features and advantages of the use, reference is made in its entirety to the previous description. The features and advantages described in the previous description, in particular with respect to the polymer and product or article according to the present disclosure, apply, mutatis mutandis, with respect to the use according to the third aspect of the disclosure.

Further features and advantages of the disclosure will become clear from the following examples in conjunction with the subject-matter of the dependent claims. The individual features can be realized either singularly or severally in combination in one example of the disclosure. The preferred examples merely serve for illustration and better understanding of the disclosure and are not to be understood as in any way limiting the disclosure.

EXAMPLES

1. Hexanedioic acid (5.84 g), 1,4-butanediol (0.92 g), 1,5-diaminopentane (4.09 g), and 1,1'-(hexane-1,6-diyl)bis(5-oxopyrrolidine-3-carboxylic acid) (3.40 g) were heated till 260° C. under constant mixing and water evaporation during 4 hours. The light-yellow melt was poured into preformed recipients for mechanical sample testing and thermal analysis.

2. Decanedioic acid (8.08 g), 1,4-butanediol (1.38 g), 1,5-diaminopentane (3.58 g), and 1-(5-carboxypentyl)-5-oxopyrrolidine-3-carboxylic acid (2.43 g) were heated till 250° C. under constant mixing and water evaporation during 4 hours. The off-white melt was poured into preformed recipients for mechanical sample testing and thermal analysis.

3. Nonanedioic acid (6.58 g), 1,4-butanediol (1.84 g), 1,6-diaminohexane (3.48 g), and pyrazine-2,5-dicarboxylic acid (2.52 g) were heated till 250° C. under constant mixing and water evaporation during 4 hours. The light brown melt was poured into preformed recipients for mechanical sample testing and thermal analysis.

4. Decanedioic acid (5.05 g), 1,4-butanediol (0.49 g), 1,6-diaminohexane (5.23 g), and 1,1'-(hexane-1,6-diyl)bis(5-oxopyrrolidine-3-carboxylic acid) (8.50 g) were heated till 250° C. under constant mixing and water evaporation during 4 hours. The yellow-orange melt was poured into preformed recipients for mechanical sample testing and thermal analysis.

5. Nonanedioic acid (7.15 g), 1,6-diaminohexane (5.82 g), and 1,1'-(hexane-1,6-diyl)bis(5-oxopyrrolidine-3-carboxylic acid) (4.09 g) were heated till 260° C. under constant mixing and water evaporation during 4 hours. The light-yellow melt was poured into preformed recipients for mechanical sample testing and thermal analysis.

6. Hexanedioic acid (4.38 g), 1,6-hexanediol (0.62 g), 1,5-diaminopentane (4.61 g), 1,1'-(hexane-1,6-diyl)bis(5-oxopyrrolidine-3-carboxylic acid) (3.40 g), and pyrazine-2,5-dicarboxylic acid (1.68 g) were heated till 260° C. under constant mixing and water evaporation during 4 hours. The light-yellow melt was poured into preformed recipients for mechanical sample testing and thermal analysis.

7. The dried material obtained from example 5, having a relative viscosity of 2.64 as determined with ASTM 789-19, was processed in monofilaments and yarns, which were subjected to tensile strength tests according to ASTM $D_{2256}$ in the deformation range of 10 to 50% with moisture content <1 wt %, resulting in measured tensile strengths in the range of (i) 24-37 MPa for unstretched filaments or yarns and (ii) 139-253 MPa for stretched filaments or yarns.

8. Comparative example: extrusion-grade polyamide-66 compound with relative viscosity of 2.8 was prepared and processed according to example 7, showing monofilament and yarn tensile strengths ranging from 74-111 MPa for stretched filaments or yarns.

9. The material obtained from example 5 was processed in tensile bars, which were subjected to tensile strength tests according to ASTM $D_{638}$, resulting in tensile strengths ranging from 54-174 MPa.

10. Comparative example: extrusion-grade polyamide-66 compound was prepared and processed according to example 9, showing tensile bar tensile strengths ranging from 36-146 MPa.

11. The dried material obtained from example 5 was subjected to biodegradation tests according to ASTM 5988-18, measuring an average and almost constant respiration rate of 217 $mg_{plastic}/kg_{soil}$·month over a period of 5 months.

12. Comparative example: extrusion-grade polyamide-66 compound was subjected to biodegradation tests as described in example 11, measuring an initial respiration rate of 135 $mg_{plastic}/kg_{soil}$·month during the first 2 months, after which the degradation showed no further progress.

13. Ecotoxicity-Assay

The polymers of examples 1 to 5 were subjected to SEA-URCHIN EMBRYOGENESIS BIOASSAY, that is, a preliminary ECOTOX assessment criteria for the classification of the ecotoxicity of tested materials using the sea-urchin embryo test with lixiviates. The results confirmed that the polymers are not hazardous. The $EC_{50}$ value (95% CI) (mg/L) ranged from 10-1000.

14. Degradation

Degradation was tested under ASTM $D_{5988}$ conditions. A typical degradation curve could be obtained differentiating between different polymers according to the disclosure, without and with 10% or 20% of linkages being ester linkages. The degradation in water was determined and given as a comparison to differentiate between aqueous and soil microbial degradation. The respective results are graphically displayed in FIG. 1.

Figure 2:
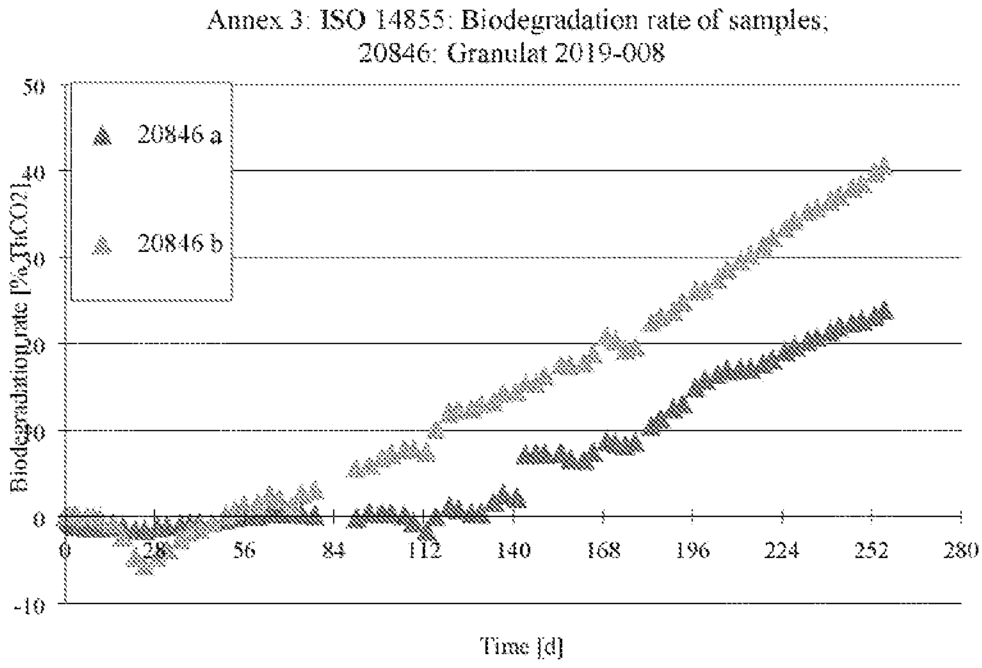
FIG. 2 illustrates a graph of degradation under ISO 14855 conditions for examples of polymers, according to the principles of the present disclosure.

Under ISO 14855 conditions, the degradation of above mentioned type-1 (non ester) was also degradable with a higher speed. The curves differed from the ones under ASTM $D_{5988}$ in a way that they showed a lag phase at the beginning of the test. The FIG. 2 shows a duplo-test of the same polymer.

15. Tensile Strength

All tensile strength measurements fell within the ranges given in the examples 7 and 9.

16. Tensile Strength after UV Exposure

The dried material obtained from example 5 was twined via ultrafine yarning and exposed to intense sunshine under hot conditions (roof installed at latitude 41° 9' during the month of April). Tensile strength of exposed twines showed to drop with 25% within 1 month exposure time compared to non-exposed twines.

Thicker filaments with approx. 2mm diameter exposed to UV-light acc. to ISO 4892-2 (without rain) for 500 h showed just a minor drop of 6% in tensile strength, but significant decrease in elongation at break of over 25%.

17. Test After 6 Months (Shelving)

Stretched filaments with tensile strengths determined up to 133 MPa, were shelved for 6 months, after which tensile strength determination was repeated: all samples showed a tensile strength between 95-104% of the original values.

18. "Free of Ester Linkages"

Several new compositions were free of ester linkages, and showed the degradation rates and strengths.

19. Degradation Rate Sustained till Completion

Figure 3:
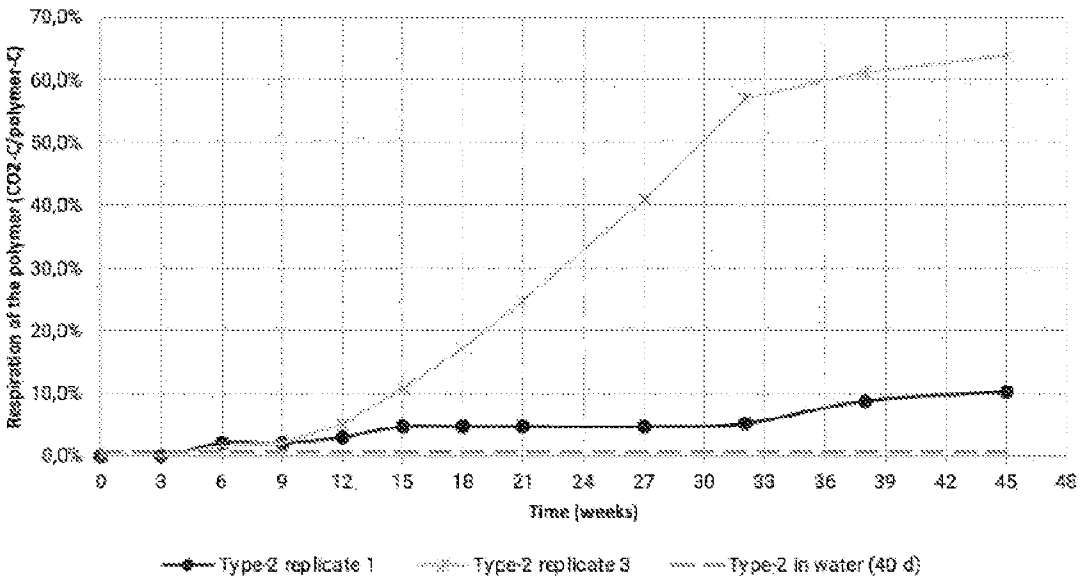
FIG. 3 illustrates a graph of degradation under ASTM $D_{5988}$ conditions of examples of polymers, according to the principles of the present disclosure.

In some biodegradation tests, high degradation rates of >200 $mg_{polymer}/kg_{soil}$·month were sustained under ASTM $D_{5988}$ conditions, giving full mineralization of the material to $CO_2$. Soil microbiota largely adapting to the material, led to metabolic activities that completed the degradation within about 40 weeks' time. This phenomenon was seen in some of the biodegradation tests but varied with different tests and soil samples (replicate 1 and 3 of the same non-ester polymeric material). The respective results are graphically displayed in FIG. 3.

20. Tensile Bars

All tensile strength measurements fell within the range given in example 9.

21. Significance of Water Uptake to Line Performance:

Trials with extruded trimmer lines with different moisture contents revealed a significant influence of moisture content on handling and mowing performance. The tested grade was much more flexible and showed better results under moist conditions.

The invention claimed is:

1. A polymer comprising a backbone chain, wherein the backbone chain comprises linear amide linkages and nitrogen-atom-containing heteromonocyclic moieties, wherein the backbone chain is free of peptide linkages or the backbone chain comprises a proportion of peptide linkages of maximum 30%, based on a total number of the linear amide linkages of the backbone chain, wherein the nitrogen-atom-containing heteromonocyclic moieties have a proportion of 5% by weight to 25% by weight, based on a total weight of the polymer, wherein the backbone chain comprises repeating units free of nitrogen-atom-containing heteromonocyclic moieties and repeating units comprising at least one of the nitrogen-atom-containing heteromonocyclic moieties, wherein the repeating units comprising the at least one of the nitrogen-atom-containing heteromonocyclic moieties comprise the following formula III:

formula III

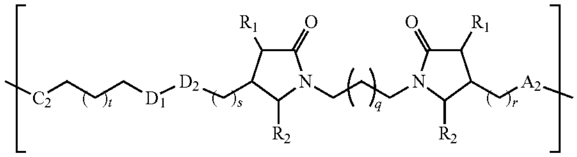

wherein q is 4, r is 0, s is 0, t is 4, $A_2$ is C═O, $C_2$ is NH, $D_1$ is NH, and $D_2$ is C═O, and $R_1$ is H, and $R_2$ is H.

2. The polymer according to claim 1, wherein the backbone chain further comprises linear ester linkages.

3. The polymer according to claim 1, wherein the linear amide linkages comprise a proportion of 1% by weight to 25% by weight, based on the total weight of the polymer.

4. The polymer according to claim 1, wherein the nitrogen-atom-containing heteromonocyclic moieties are selected from the group consisting of pyrrolidone moieties, pyridine moieties, pyrazine moieties, pyrimidine moieties, pyrrolidone derivative moieties, pyridine derivative moieties, pyrazine derivative moieties, pyrimidine derivative moieties, and combinations of at least two of the nitrogen-atom-containing heteromonocyclic moieties.

5. The polymer according to claim 1, wherein a number of the repeating units free of nitrogen-atom-containing heteromonocyclic moieties is higher than a number of the repeating units comprising at least one of the nitrogen-atom-containing heteromonocyclic moieties.

6. The polymer according to claim 1, wherein, based on a total number of the repeating units, every fifteenth to second repeating unit comprises at least one of the nitrogen-atom-containing heteromonocyclic moieties.

7. The polymer according to claim 1, wherein the polymer has a degradation rate of 5 $mg_{plastic}/kg_{soil}$·month to 500 $mg_{plastic}/kg_{soil}$·month.

8. The polymer according to claim 1, wherein the polymer has a tensile strength of 50 MPa to 500 MPa.

9. A product or article comprising a polymer according to claim 1.

10. The product or article according to claim 9, wherein the product or article is selected from the group consisting of trimmer line, plastic cutting blade, monofilament, multifilament, yarn, twine, textile fabric, fishing net, compound, injection molded part, blow-molded part, extrusion molded product, film, and sheet.

11. The product or article according to claim 9, wherein the product or article is a trimmer line.

12. The polymer according to claim 2, wherein the linear ester linkages have a proportion of 0.5% by weight to 25% by weight, based on the total weight of the polymer.

* * * * *